Patented July 14, 1931

1,814,434

UNITED STATES PATENT OFFICE

ORIN D. CUNNINGHAM, OF PROVO, UTAH, ASSIGNOR TO PETER C. REILLY, OF INDIAN-APOLIS, INDIANA

FROTH FLOTATION PROCESS

No Drawing. Application filed September 10, 1928. Serial No. 305,141.

This invention relates to the recovery of minerals, such as sulfide ores and the like, by the froth flotation process and is herein described as applied to the concentration of minerals and ores by the use of certain ketone-condensation sulfur products as a flotation collecting reagent.

More particularly this invention is based upon the discovery that a highly effective flotation reagent can be obtained by the reaction of a ketone, (such, for example, as acetone) with an alkali metal hydroxide and carbon disulfide; this reaction yielding a compound or compounds of complex molecular structure, which is herein referred to as a "ketone-condensation sulfur product".

To illustrate the type of product that may be formed by the reaction according to the invention, it is stated in the literature (Berichte der deutschen chemischen Gesellschaft, vol. 38, page 2888) that the reaction of diethyl ketone with an alkali hydroxide and carbon disulfide yields dimethyl ketopenthiophen dithiol of the following structure

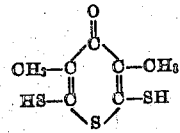

and that the same type of compound is formed as the main product of reaction with any ketone of the formula $R \cdot CH_2 \cdot CO \cdot CH_2 \cdot R$, where (R) stands for either an alkyl or aryl group; the reaction taking place being expressed according to the following equation:—

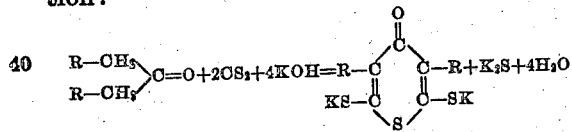

As specific examples the following methods are given for preparing the ketone-condensation sulfur product of the invention, but without intending to restrict the invention thereto:—

Example 1

5 parts of sodium hydroxide and 15–20 parts of very pure acetone were ground together until the alkali had either gone into solution or was in a finely dispersed condition. To this was then added ten parts of carbon disulfide ($CS_2$) and the reaction completed by grinding a little longer. The reaction mixture was allowed to stratify, and was separated into two layers. One layer consisted of an acetone-carbon disulfide solution which, on evaporating off the solvents (unreacted acetone and $CS_2$), yielded 5.2 parts of the ketone-condensation sulfur product. The other layer consisted of dark red sticky, gummy residue, weighing 7.5 parts.

The latter residue of the above preparation, on drying at 50–60° C., set to solid product (weight about 6.5 parts) which was shown to consist largely of sodium sulfide.

Depending upon the amount of water present, the residue may be a dark red sticky solid, or a material having the appearance of tar or a mobile liquid of a reddish color.

While very pure acetone was used in this example, the commercial grades or even the relatively impure grades of acetone of commerce may also be used. This applies also to the other ketones referred to.

In the above example, instead of carrying out the reaction in two steps, the reacting substances (acetone, alkali metal hydroxide and $CS_2$) may be ground together in a one step operation, nor is the invention limited to carrying out the reaction at room temperature.

Example 2

With the low boiling ketones (such, for example, as acetone), the reaction may be carried out in a Soxhlet extraction type of apparatus, whereby a mixture of a ketone and carbon disulfide is made to continuously pass over (and react with) some coarsely ground alkali metal hydroxide held in a porous basket or cup, by a continuous and cyclic vaporization and then condensation of the acetone-carbon disulfide mixture.

By this type of process, using 8 parts of sodium hydroxide, 80 parts of acetone, and 20 parts of carbon disulfide, there were obtained 11 parts of the ketone-condensation sulfur product, from the acetone-carbon disulfide solution, and 7.8 parts of an inorganic residue from the cup which originally held the alkali metal hydroxide, the inorganic matter consisting largely of sodium sulfide.

In place of sodium hydroxide, in the above example, potassium hydroxide may be used with equally good results and while the above proportions of reacting substances are given as possible examples, the invention is not limited to the use of any definite quantity of the chemicals herein named. It is preferable in practice to use (as in the above examples) an excess of the acetone to constitute a solvent.

*Example 3*

Into a suitable flask was placed 10 parts of dibenzyl ketone, 25 parts of carbon disulfide and 10.8 parts of finely ground potassium hydroxide, the reaction mixture being cooled to keep the temperature of reaction at 25° C. or thereabout. Over a period of about 24 hours the reaction mixture was intermittently triturated with a flattened glass rod, the reaction being conducted at room temperature (about 25° C.) and the reaction finally completed by heating on a steam bath for one hour at about the boiling point of carbon disulfide. The product thus obtained was freed of excess carbon disulfide and moisture present by allowing it to stand in a drying desiccator under vacuum over night; the resulting reddish crystalline product consisting of a mixture of potassium sulfide and the ketone-condensation sulfur product, and weighing about 27 parts.

This product may be used directly as a flotation reagent or it may be freed of potassium sulfide by extracting with absolute ethanol (the ketone-condensation sulfur product being very soluble in ethanol and the potassium sulfide relatively insoluble); the reddish oily crystalline product obtained, on evaporating off the ethanol, consisting of the potassium salt of the ketone-condensation sulfur product, relatively free of potassium sulfide, and weighing 15.0–18.0 parts.

Another method of making the above separation may be obtained by dissolving the product of reaction in water and precipitating the ketone-condensation sulfur product as a free acid by acidifying with dilute hydrochloric acid. The free acid ketone-condensation sulfur product thus separated may be used in froth flotation as the free acid or as an alkali metal salt thereof by dissolving it in sodium or potassium hydroxide solution.

As a part of the whole process in the above examples, the alkali metal sulfide by-product, formed in the preparation of the flotation reagent, may be regenerated as alkali metal hydroxide, and used over again, for example by oxidizing the sulfide to sulfate and then causticizing with lime.

The products, such as those illustrated in the above examples, were employed as collecting reagents in the flotation of a copper sulfide ore of the Utah Copper Co., analyzing about 1.0% copper, in the ratio of one tenth pound (0.1 lb.) of the product per ton of dry ore, and pine oil as a frothing reagent, and a lime circuit being employed therewith. The ore was subjected to the ordinary flotation operation in a mechanical agitation type of flotation machine and a tailing analyzing about 0.10% copper was obtained together with a high grade concentrate, corresponding to a recovery of about 90% of the copper value of the ore.

The flotation reagent can be used in the flotation of ores in general, and larger or smaller amounts of the reagent than above specified can also be used, depending on the type of ore and other conditions. Furthermore, the invention is not limited to any particular type of flotation cell, and instead of an alkaline circuit as used in the above example, an acid or neutral circuit can be employed.

In the above specification mention is made of ketones, such, for example, as acetone and di-benzyl ketone. It is to be understood that other ketones or mixtures thereof, such as di-ethyl ketone, di-propyl ketone and higher ketones, as well as mixed ketones such as methyl-ethyl ketone and ketones containing both alkyl and aryl residues, can be likewise employed.

Claims:—

1. A flotation process in which ore is subjected to froth-flotation in the presence of a ketone-condensation sulfur product which can be formed from ketone and carbon bisulfide.

2. A flotation process in which ore is subjected to froth-flotation in the presence of a ketone-condensation sulfur product which can be formed from ketone and carbon bisulfide and a frothing agent such as pine oil.

3. A flotation process in which froth-flotation of ore is conducted in an aqueous liquid carrying a small amount of a reaction product of caustic alkali, a ketone and $CS_2$.

4. A process of froth flotation in the presence of a compound having the general formula

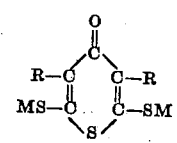

in which R represents hydrogen, alkyl or aryl and M represents an alkali-forming metal or hydrogen.

5. A process which comprises froth flotation in the presence of a condensation product of an aliphatic ketone and carbon bisulfide which can be formed in the presence of an alkali.

6. A process which comprises froth flotation in the presence of a condensation product of acetone and carbon bisulfide which can be formed in the presence of an alkali.

7. A process which comprises froth flotation in the presence of a ketopenthiophen dithiol and a frothing agent.

8. A process which comprises froth flotation in the presence of a di-substituted ketopenthiophen dithiol and a frothing agent.

9. A process which comprises froth flotation in the presence of a di-alkyl ketopenthiophen dithiol and a frothing agent.

10. A process which comprises froth-flotation in the presence of a ketone carbon bisulfide condensation product.

In testimony whereof I have signed my name to this specification.

ORIN D. CUNNINGHAM.